United States Patent
Yung et al.

(10) Patent No.: US 7,577,154 B1
(45) Date of Patent: Aug. 18, 2009

(54) SYSTEM AND METHOD FOR TRAFFIC ACCOUNTING AND ROUTE CUSTOMIZATION OF NETWORK SERVICES

(75) Inventors: John Yung, Fremont, CA (US); Jay Steven Adelson, San Francisco, CA (US)

(73) Assignee: Equinix, Inc., Foster City, CA (US)

( * ) Notice: Subject to any disclaimer, the term of this patent is extended or adjusted under 35 U.S.C. 154(b) by 1157 days.

(21) Appl. No.: 10/162,313

(22) Filed: Jun. 3, 2002

(51) Int. Cl.
*H04L 12/56* (2006.01)
*H04M 15/00* (2006.01)

(52) U.S. Cl. .................. 370/400; 370/401; 709/203; 379/114.03

(58) Field of Classification Search ............. 370/400, 370/401, 351, 352; 709/203; 705/34, 52; 379/114.03
See application file for complete search history.

(56) References Cited

U.S. PATENT DOCUMENTS

| | | | |
|---|---|---|---|
| 6,151,629 A * | 11/2000 | Trewitt | 709/227 |
| 6,515,224 B1 | 2/2003 | Pedro | |
| 6,603,758 B1 * | 8/2003 | Schmuelling et al. | 370/352 |
| 6,665,702 B1 * | 12/2003 | Zisapel et al. | 718/105 |
| 6,912,567 B1 * | 6/2005 | Allard et al. | 709/223 |
| 6,971,029 B1 | 11/2005 | Avery et al. | |
| 6,976,296 B2 | 12/2005 | Boudreault | |
| 6,981,026 B2 * | 12/2005 | Noda et al. | 709/213 |
| 6,985,963 B1 * | 1/2006 | Johnson et al. | 709/242 |
| 7,139,728 B2 * | 11/2006 | Rigole | 705/26 |
| 2001/0034704 A1 * | 10/2001 | Farhat et al. | 705/39 |
| 2002/0010915 A1 * | 1/2002 | Maeda | 717/11 |
| 2002/0019786 A1 * | 2/2002 | Gonzalez et al. | 705/28 |
| 2002/0073182 A1 * | 6/2002 | Zakurdaev et al. | 709/220 |
| 2002/0099616 A1 * | 7/2002 | Sweldens | 705/26 |
| 2002/0129358 A1 * | 9/2002 | Buehl et al. | 725/1 |
| 2003/0172170 A1 * | 9/2003 | Johnson et al. | 709/230 |
| 2003/0191841 A1 * | 10/2003 | DeFerranti et al. | 709/226 |
| 2004/0098468 A1 * | 5/2004 | Kang | 709/219 |
| 2007/0005954 A1 * | 1/2007 | Skemer | 713/153 |

OTHER PUBLICATIONS

"Netra tl Systems LOMlite User's Guide," Sun Microsystems, Inc., Part No. 806-2038-10, Revision A, Jul. 1999, pp. 1-8.
"Oracle Financial Applications," Rochester Institute of Technology, vol. 1, Issue 7, Mar. 2001, pp. 1-7.
"Sun Enterprise™ 420R Server Owner's Guide," Sun Microsystems, Inc., Part No. 806-1078-10, Revision A, Oct. 1999, pp. 1-174.

* cited by examiner

*Primary Examiner*—Jayanti K Patel
*Assistant Examiner*—Saba Tsegaye
(74) *Attorney, Agent, or Firm*—Rutan & Tucker, LLP (57) ABSTRACT

Traffic accounting and route customization of network services is described. According to one embodiment of the invention, a route customization server selects one or more network service providers to provide network services for one of a plurality of network users. The selection is based on a change request being provided by the one of the plurality of users. In another embodiment of the invention, a traffic accounting server provides billing information to the one of the plurality of users based on one or more media access control (MAC) addresses included in the network traffic of the one of the plurality of users.

16 Claims, 13 Drawing Sheets

*equinix*

EQUINIX DIRECT

- HOME
- NETWORK TRAFFIC
- ROUTE CUSTOMIZATION
- ACCOUNT DETAILS

Route Customization

Welcome! cust5user, Customer5
05/26/02 04:15:48 PM, PDT

STEP2

Port: cust5-lab01 <u>View Current Configuration</u>     <u>Provider Price List</u>

Bandwidth Pricing Limit: $ [500]   — 416
— 417
☑ Auto-Adoption <u>What's this?</u>

Overrides

Network Providers:

| Accept — 411 | All ISP List — 419 | Reject — 412 |
|---|---|---|
| [ >> ] [ << ] | isp2-lab02<br>isp1-lab01<br>isp4-lab02<br>isp3-lab02 [ >> ] [ << ] | |

— 413          — 414          — 418
Network provider    Price Limit    Delete

| -- Select -- ▼ | | ☐ |
| -- Select -- ▼ | | ☐ |
| -- Select -- ▼ | | ☐ |
| -- Select -- ▼ | | ☐ |

( Submit )  ( Cancel )

CLIENT_PORT_STATS (661)

| | |
|---|---|
| TIMESTAMP | DATE |
| SRC_CLIENT_PORT_ID | NUMBER |
| DST_CLIENT_PORT_ID | NUMBER |
| OCTETS | NUMBER |
| BPS | NUMBER |
| PACKETS | NUMBER |
| SRC_PRICE | NUMBER(14,2) |
| DST_PRICE | NUMBER(14,2) |

CLIENT_PORT_STATS_HOURLY

| | |
|---|---|
| TIMESTAMP_DATE | DATE |
| TIMESTAMP_HOUR | NUMBER |
| SRC_CLIENT_PORT_ID | NUMBER |
| DST_CLIENT_PORT_ID | NUMBER |
| OCTETS | NUMBER |
| BPS | NUMBER |
| PACKETS | NUMBER |
| SRC_PRICE | NUMBER(14,2) |
| DST_PRICE | NUMBER(14,2) |

CLIENT_PORT_STATS_DAILY

| | |
|---|---|
| TIMESTAMP_DATE | DATE |
| SRC_CLIENT_PORT_ID | NUMBER |
| DST_CLIENT_PORT_ID | NUMBER |
| OCTETS | NUMBER |
| BPS | NUMBER |
| PACKETS | NUMBER |
| SRC_PRICE | NUMBER(14,2) |
| DST_PRICE | NUMBER(14,2) |

CLIENT_PORT_STATS_MONTHLY

| | | |
|---|---|---|
| TIMESTAMP_YEAR | NUMBER | \<pk\> |
| TIMESTAMP_MONTH | NUMBER | \<pk\> |
| SRC_CLIENT_PORT_ID | NUMBER | \<pk\> |
| DST_CLIENT_PORT_ID | NUMBER | \<pk\> |
| OCTETS | NUMBER | |
| BPS | NUMBER | |
| PACKETS | NUMBER | |
| SRC_PRICE | NUMBER(14,2) | |
| DST_PRICE | NUMBER(14,2) | |

CLIENT_PORT_PORT_STATS (660)

| | |
|---|---|
| TIMESTAMP | DATE |
| SRC_CLIENT_PORT_MAC_ID | NUMBER |
| DST_CLIENT_PORT_MAC_ID | NUMBER |
| OCTETS | NUMBER |
| BPS | NUMBER |
| PACKETS | NUMBER |
| SRC_PRICE | NUMBER(14,2) |
| DST_PRICE | NUMBER(14,2) |

CLIENT_PORT_PORT_STATS_HOURLY

| | |
|---|---|
| TIMESTAMP_DATE | DATE |
| TIMESTAMP_HOUR | NUMBER |
| SRC_CLIENT_PORT_MAC_ID | NUMBER |
| DST_CLIENT_PORT_MAC_ID | NUMBER |
| OCTETS | NUMBER |
| BPS | NUMBER |
| PACKETS | NUMBER |
| SRC_PRICE | NUMBER(14,2) |
| DST_PRICE | NUMBER(14,2) |

CLIENT_PORT_PORT_STATS_DAILY

| | |
|---|---|
| TIMESTAMP_DATE | DATE |
| SRC_CLIENT_PORT_MAC_ID | NUMBER |
| DST_CLIENT_PORT_MAC_ID | NUMBER |
| OCTETS | NUMBER |
| BPS | NUMBER |
| PACKETS | NUMBER |
| SRC_PRICE | NUMBER(14,2) |
| DST_PRICE | NUMBER(14,2) |

CLIENT_PORT_PORT_STATS_MONTHLY

| | | |
|---|---|---|
| TIMESTAMP_YEAR | NUMBER | \<pk\> |
| TIMESTAMP_MONTH | NUMBER | \<pk\> |
| SRC_CLIENT_PORT_MAC_ID | NUMBER | \<pk\> |
| DST_CLIENT_PORT_MAC_ID | NUMBER | \<pk\> |
| OCTETS | NUMBER | |
| BPS | NUMBER | |
| PACKETS | NUMBER | |
| SRC_PRICE | NUMBER(14,2) | |
| DST_PRICE | NUMBER(14,2) | |

ROLE_ACTION

| | | |
|---|---|---|
| ROLE_NAME | VARCHAR2(30) | \<pk\> |
| ACTION_NAME | VARCHAR2(30) | \<pk\> |

ROLE

| | | |
|---|---|---|
| ROLE_NAME | VARCHAR2(30) | \<pk\> |
| TEMPLATE_NAME | VARCHAR2(100) | |

ED_APPLICATION_PARAMETER

| | | |
|---|---|---|
| PARAMETER_ID | NUMBER | \<pk\> |
| NAME | VARCHAR2(80) | |
| DESCRIPTION | VARCHAR2(255) | |
| VALUE | VARCHAR2(80) | |
| STATUS | VARCHAR2(20) | |
| EFFECTIVE_DATE | DATE | |
| CREATED_BY | NUMBER | |
| DATE_CREATED | DATE | |
| MODIFIED_BY | NUMBER | |
| DATE_MODIFIED | DATE | |

ED_SYSPARAM

| | | |
|---|---|---|
| NAME | VARCHAR2(80) | \<pk\> |
| VALUE | VARCHAR2(80) | |
| DESCRIPTION | VARCHAR2(255) | |
| DEFAULT_VALUE | VARCHAR2(20) | |

SYSTEM AND METHOD FOR TRAFFIC ACCOUNTING AND ROUTE CUSTOMIZATION OF NETWORK SERVICES

FIELD OF THE INVENTION

The invention relates generally to providing network services, and more particularly, to traffic accounting and route customization of network services.

BACKGROUND

Business entities often negotiate agreements with one or more network service providers to provide network access to multiple networks. For example, an electronic commerce business may negotiate a contract agreement with an Internet Service Provider (ISP) to provide high-speed access to the Internet enabling, potential customers to access its content, or to provide access to a banking entity to pay bills or to collect account receivables from customers. Typically, there is a one-to-one negotiation between the business entity and the ISP providing the service.

At times, large business entities negotiate individually with multiple ISPs to provide network services because, for example, a single network service provider is unable to handle the network traffic bandwidth of the large entity. Therefore, the business entity has a network connection or channel directly from its internal network to each individually negotiated network service provider. In this way, each network service provider manages, monitors, and bills the business entity based only on the network traffic transmitted over the network connection dedicated to the contracted business entity.

However, the cost of a business entity to connect its internal network with one or more network service providers may be quite significant depending on factors, such as, the cost of purchasing, installing, and maintaining additional network hardware, software, and/or transmission media (e.g., fiber optic lines, T-1 lines, etc.) between the business entity and each contracted ISP. Maintaining the new network elements is especially cumbersome if each ISP has different network protocols and standards to contend with.

In addition, every so often an ISP may determine it does not have the bandwidth to handle the current network traffic and negotiates an agreement with a second ISP to handle for example, the delivery of a portion of the network traffic to its intended destination. The negotiated use of a second ISP to deliver network traffic is typically unknown to the primary business entity because the business entity continues to only send its network traffic to the first ISP. Additionally, the second ISP does not bill the business entity directly because the agreement is between the first ISP and the second ISP. However, the additional cost might be passed along to the business entity by way a higher billing rate. This way, the business entity is charged a higher billing rate than the business entity would have otherwise been charged, if the business entity would have negotiated the billing rate with both ISPs individually.

SUMMARY OF THE INVENTION

Traffic accounting and route customization of network services is described. According to one embodiment of the invention, a route customization server selects one or more network service providers to provide network services for one of a plurality of network users. The selection is based on a change request being provided by the one of a plurality of users. In another embodiment of the invention, a traffic accounting server provides billing information to the one of the plurality of users based on one or more media access control (MAC) addresses included in the network traffic of the one of the plurality of users.

BRIEF DESCRIPTION OF THE DRAWINGS

The present invention is illustrated by way of example, and not limitation, in the figures of the accompanying drawings, in which.

DETAILED DESCRIPTION

Traffic accounting and route customization of network services are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
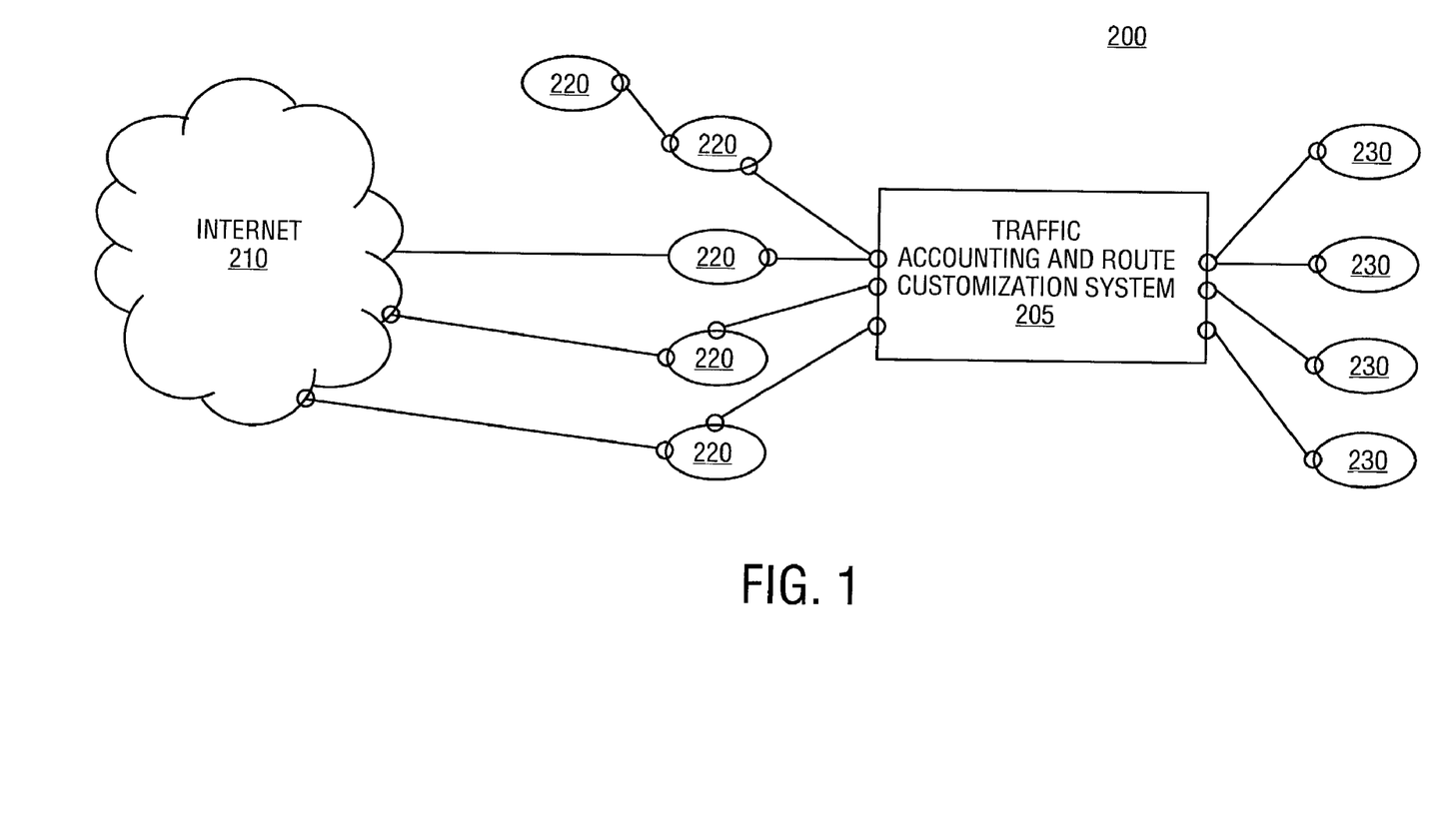
FIG. 1 illustrates a block diagram of a network environment having a traffic accounting and route customization system according to one embodiment of the invention.

FIG. 1 illustrates a block diagram of one embodiment of a network environment 200 having a traffic accounting and route customization system 205. According to one embodiment of the invention, the system 205 facilitates and provides a conduit from which network service providers 220 provide network access to each of the users 230. The users 230 may include business entities, Internet content providers, as well as, other network service providers. In the embodiment shown in FIG. 1, each of the network service providers are independent entities and provide access to the Internet 210 and/or to a business entity 211 via network routers. The system 205 receives at least network pricing information from each of the network service providers 220 and receives at least network service criteria information from each of the users 230, to associate a specific user 230 with a specific network service provider 220. Once the system 205 has determined a satisfactory network route between the users 230 and the network service providers 220, the system 205 may immediately route the network traffic to each network service provider 220 accordingly, as will be described.

It should be understood that while the network service providers 220 are illustrated as being separate from the system 205, in alternative embodiments, the network service providers have a network element, such as, a switch or a router, physically located at the same facility as the system 205. In this way, the system 205 may automatically and immediately re-route the network traffic of each user 230 to the appropriate network service provider(s) 220.

According to another aspect of the invention, the system 205 calculates and bills each user 230 for the network traffic routed by each contracted network service provider, within a single billing statement, over a specific billing period (e.g., monthly network usage). Because the specific user 230 does not have a direct connection to a specific network service provider 230, the system 205 calculates the payment due based on the media access control (MAC) addresses of the network elements of each user 230 and the network service providers 220, as will be further described.

Figure 2:
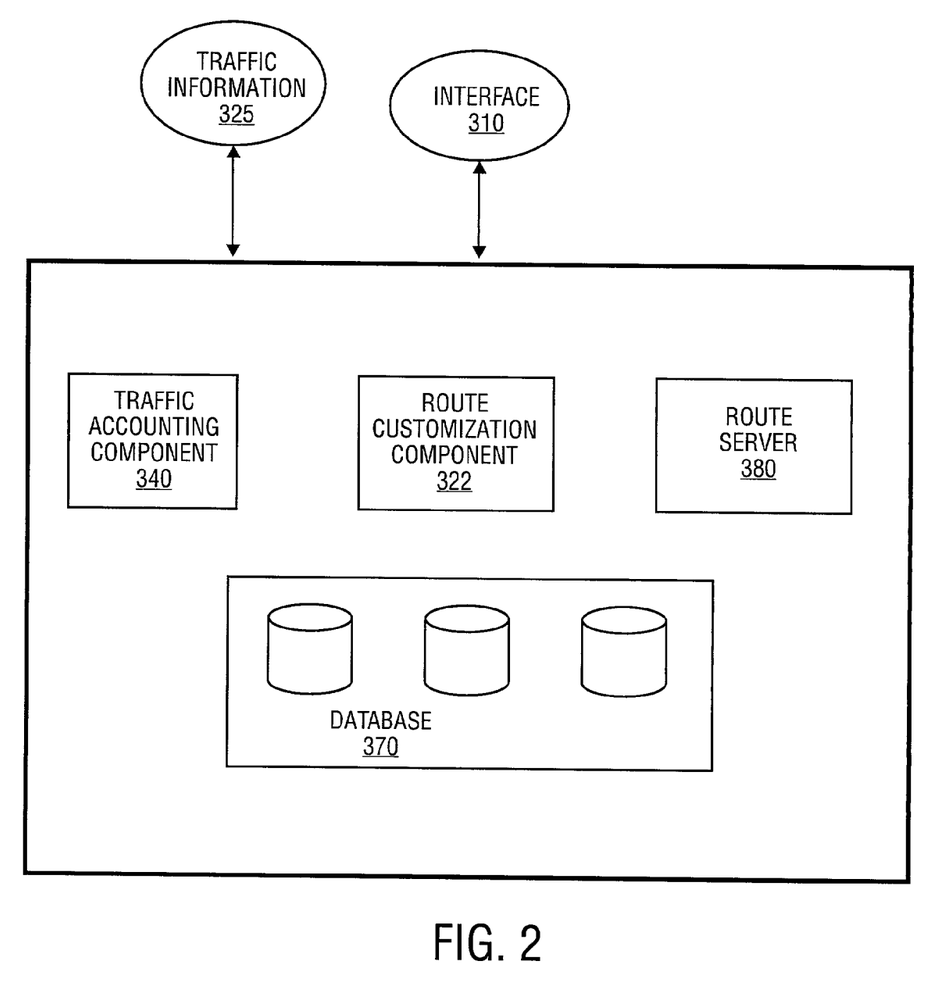
FIG. 2 illustrates a block diagram of one embodiment of a traffic accounting and route customization system according to one embodiment of the invention.

FIG. 2 illustrates the system 205 according to one embodiment of the invention. The system 200 includes a route customization component 322, a traffic accounting component 340, a router server component 380, and a database 370. An Entity-Relationship (ER) diagram 600 of one embodiment of the data structures of database 370 is shown in FIG. 6 will be further described below.

The route customization component 322 generates a route customization change request to re-route network traffic of a specific user 230 to one or more selected network service providers 220. In general, the change request includes a set of network service criteria information provided by each user 230 and each network service provider 220. The network service criteria could be considered the negotiating terms offered by both the users 230 and the network service provider 220 in reaching an agreement to accept and provide the network services. For example, a change request for a user 230 might express the desire to select a network service provider 220 offering network services below a specific price; or a network service provider 220 might, for example, generate a change request to reflect a change in its network service billing rate or pricing.

Figure 3:
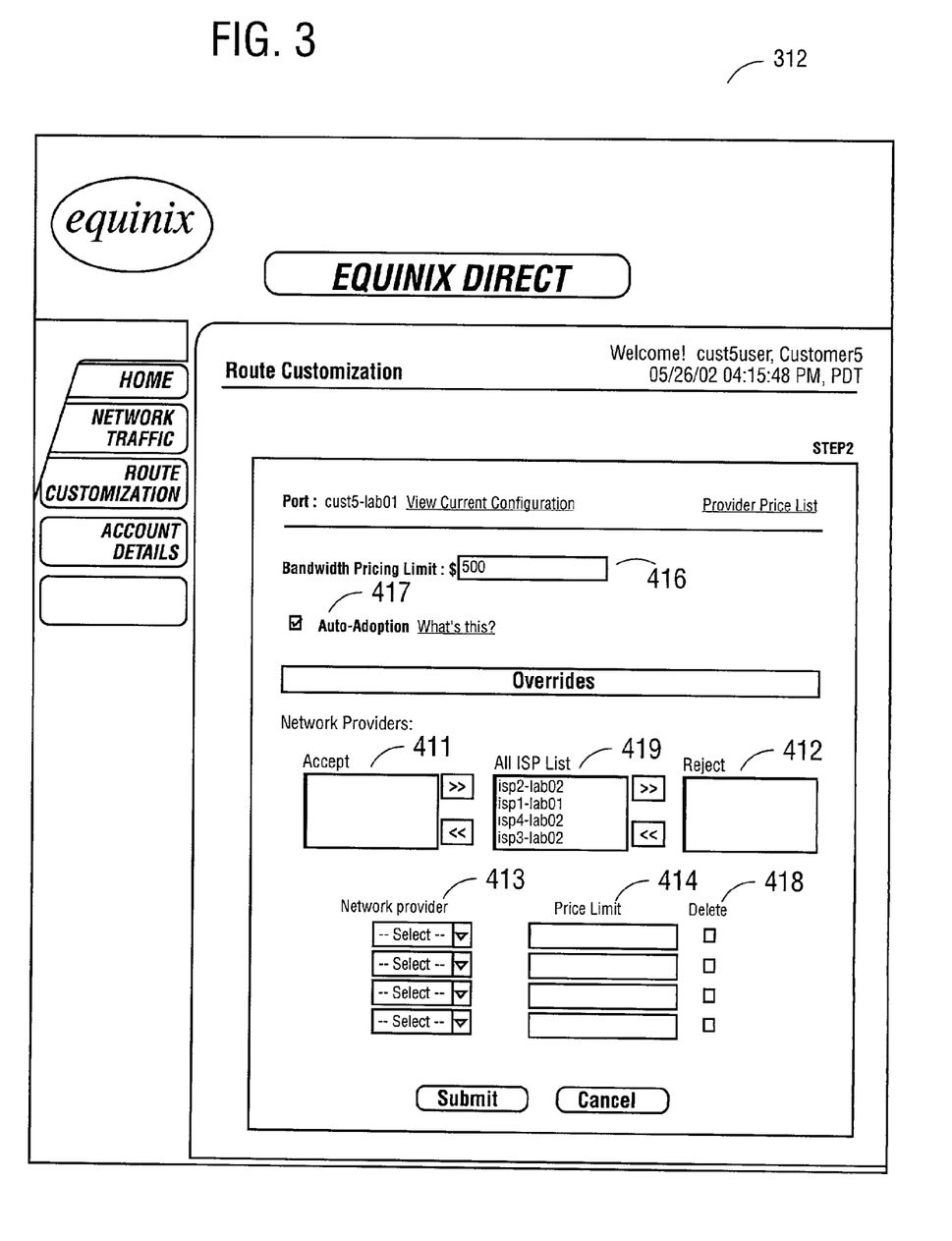
FIG. 3 illustrates one embodiment of a user interface used to access the traffic accounting and route customization system according to one embodiment of the invention.

The users 230 and network service providers 220 may generate route customization change requests from a user interface 310. The user interface 310 may communicate with the system 205 directly, or indirectly from a remote network with a web-browser via the Internet. For example, FIG. 3 illustrates a web page 312 from which the users 230 may access the system 205 to customize a network route. Using the web page 312 as a user interface 310, a user may issue a route customization change request by selecting network service providers specifically and/or by a pricing budget. Specifically, the user 230 may select one or more network service providers from the Accept select box 411 and/or the Reject select box 412. The network service providers 220 selected in the Accept select box 411 are network service providers 230 a user 230 would be willing to have network service provided from regardless of price. The network service providers 220 selected in the Reject select box 412 are network service providers a user 230 would not be willing to have network service provided from, regardless of any other condition. In this way, the available network service providers 220 to be selected as accepted or rejected are selected from the 'All ISP list' 419.

A user 230 may also indicate the desire to receive network services from a specific network service provider 220 selected in one of the network provider fields 413 if the billing rate charged by the network service provider 220 selected in the field 413 is less than or equal to the price limit selected in the related set price limit field 414. The user 230 may later de-select the specific network service provider by choosing the related delete check box 418.

In the bandwidth pricing limit field 416, a user 230 may indicate the desire for the system 205 to route network traffic to any one of the network service providers 220 with the bandwidth-pricing limit less than or equal to the price limit selected in the bandwidth pricing limit field 416. If the Auto-Adoption box 417 is selected, the network traffic of the selecting user 230 will be automatically and immediately re-routed to any new network service provider that joins the system 205 having a bandwidth price limit less than or equal to the price selected in the Bandwidth pricing limit field 416.

Upon selecting the network service criteria from which a user 230 is willing to accept the peering of the selected network service providers 220, the user 230 submits the change request to the system 205 to be stored in the database 370. It should be understood that the network service providers 220 might also provide the system 205 with criteria information or adjust its billing rates from the user interface 310. For example, a network service provider 220 might indicate the desire not to provide network services to a selected one or more users 230 (e.g., users 230 that have delinquent accounts, that consume too much bandwidth, etc.). This criteria information from each network service provider 220 may also be stored in the database 370.

In one example of a business implementation, network service providers 220 are allowed to change bandwidth pricing once per billing month, effective on the first day of a billing month. Change request are submitted prior to the end of the third week of a billing month. At the beginning of the fourth week, email notifications are sent to each user 230 with the new pricing information of all network service providers 220. In addition, users 230 are allowed to submit four change requests per billing month with a minimum of twenty-four hours apart.

Given the multiple customized route change requests, the route customization component 322 generates one or more policy rules describing the various peering combinations of network service providers 220 to a user 230. In one embodiment, each generated policy rule represents a new one-to-one circuit route between each user 230 and network service provider 220 that satisfies the given network service criteria given in the change request.

The router server component 380 reads the policy rules and reconfigures one or more network element(s) to re-route the network traffic from the previous network service providers 220 used by a user 230, to the recently selected network service providers 220, per the policy rules. For example, the route server component 380 might propagate Border Gateway Protocol (BGP) network prefix announcements to routers on the network 200 based on the received policy rules. In one embodiment, the router server component 380 is an open source software product, such as the route server software provided by Merit Networks, Inc., of Ann Arbor, Mich.

Figure 4:
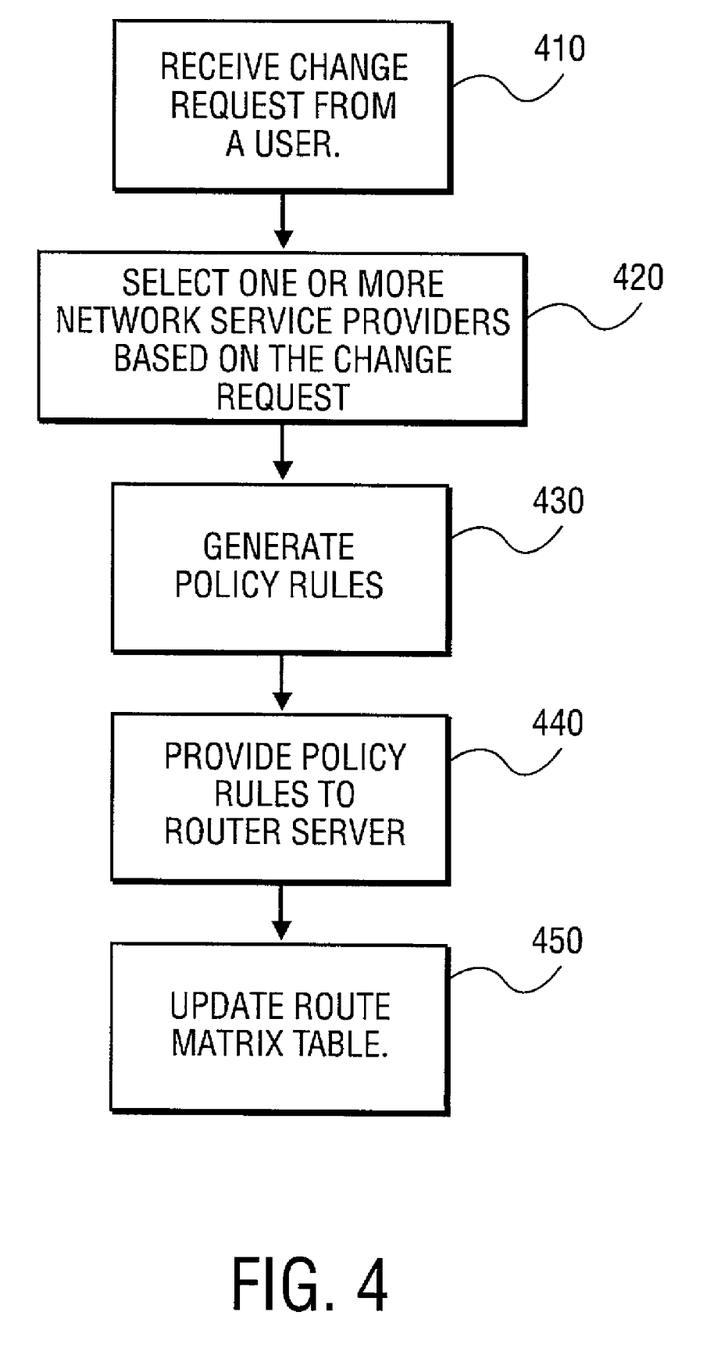
FIG. 4 illustrates a process flow diagram for customizing a network route for a user according to one embodiment of the invention.

FIG. 4 illustrates a process flow for providing route customization according to one embodiment of the invention. At block 410, the route customization component 322 receives a route customization change request directly from one of the users 230. The route customization change request includes a set of network service criteria the user 230 has selected to be used by the route customization component 322 to determine the network service providers 220 to provide the requested network service.

At block 420, the route customization component 322 selects one or more of the network service providers 220 to handle the network traffic of the user 230 based on the route customization change request. The route customization component 322 creates a policy rule having the participants that satisfy the network services criteria (block 430). The policy rule is sent to the router server component 380 (block 440) which routes the network traffic from the previous network service providers 220 to the newly selected network service providers 220 for the user 230 associated with the change request.

In one embodiment, each policy rule associated with a specific change request is assigned a 'Change Identifier' before each policy rule is sent to the route server 380. In this way, if any of the requested route changes fail (e.g., a necessary network element is not functioning properly), the entire change transaction will fail (e.g., all the committed changes will be rolled back given the same change identifiers), and the previously used routes provided by the "previous" network service providers 220, will continue to be used.

If the requested changes are successful, the route server 380 may synchronize the updated routing to a route matrix table stored in the database 370 (block 450). The route matrix allows the route customization component 322 to maintain a status of which network service providers 220 provide network service for each user 230. The matrix keeps track of all peering, as well as the state (success or failure) of all change requests. The matrix may work in conjunction with the public Internet Routing Registry (IRR), where the routing policies of the participants are stored to safeguard the privacy of these peering policies. In one embodiment, the data in the route matrix table is logically separated and stored in a CLIENT_PEER_HDR table 655, a CLIENT_PEER_SOURCE table 656, a CLIENT_PEER_TARGET table 657, a CLIENT_PICK_HDR table 655, and a CLIENT_PICK_DETAIL table 658, as shown in FIG. 6. In this way, the route matrix information is stored in an efficient manner well known to those of ordinary skill in the art.

It should be understood that since each of the users 230 connect directly with the system 205 rather than individually to each network service provider 220, each user 230 saves the cost of purchasing, installing, and maintaining additional hardware, software, and/or transmission media to communicate with each network service provider 220 in various physical locations. The savings is more significant when the users 230 are peering with two or more network server providers 220 because the system 205 requires only one connection to reach multiple network service providers 220. In this way, the system 205 also provides each of the network service providers 220 a conduit from which to offer immediate cost savings to multiple customers. If the network service providers 220 are within close proximity to the network service providers, the system 205 may also provide increased peering, transit, and network traffic exchange in order to provide faster re-routing of network traffic.

Figure 5:
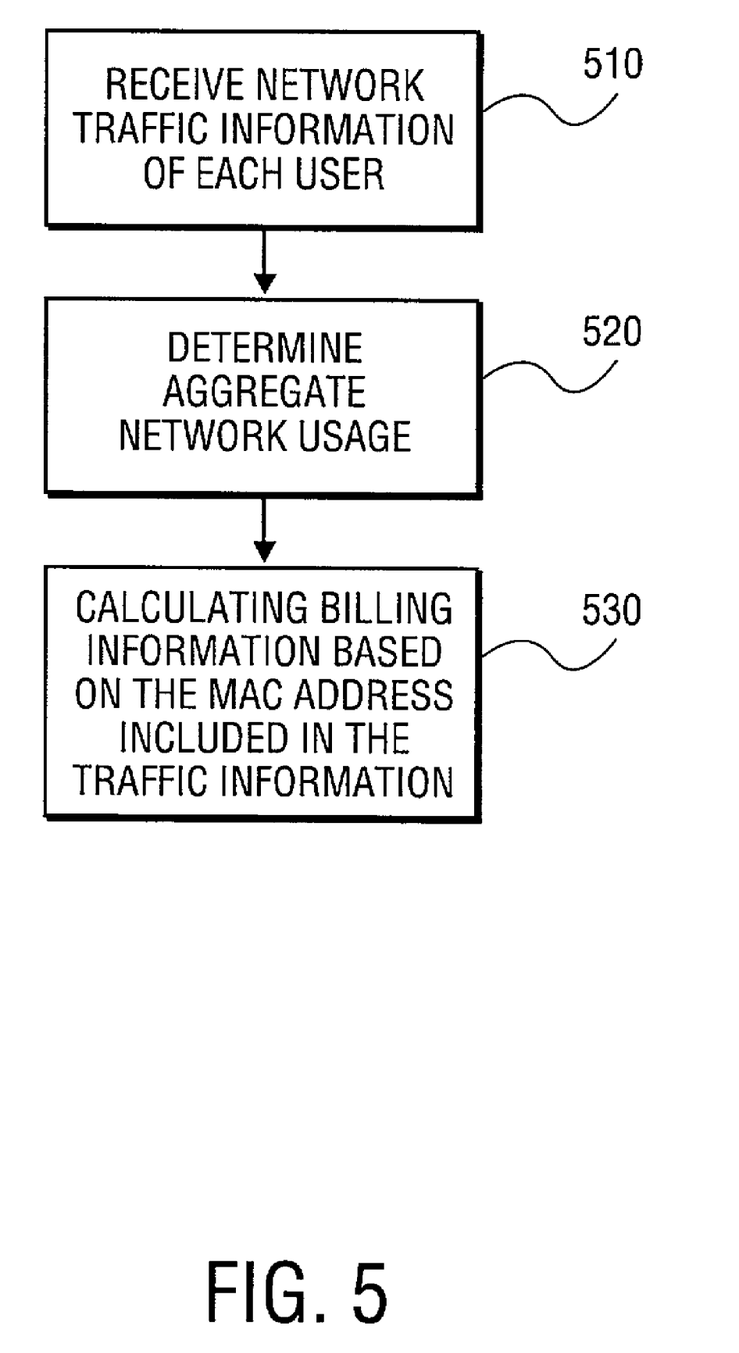
FIG. 5 illustrates a process flow diagram for network traffic usage of a user according to one embodiment of the invention.
Figure 6A:
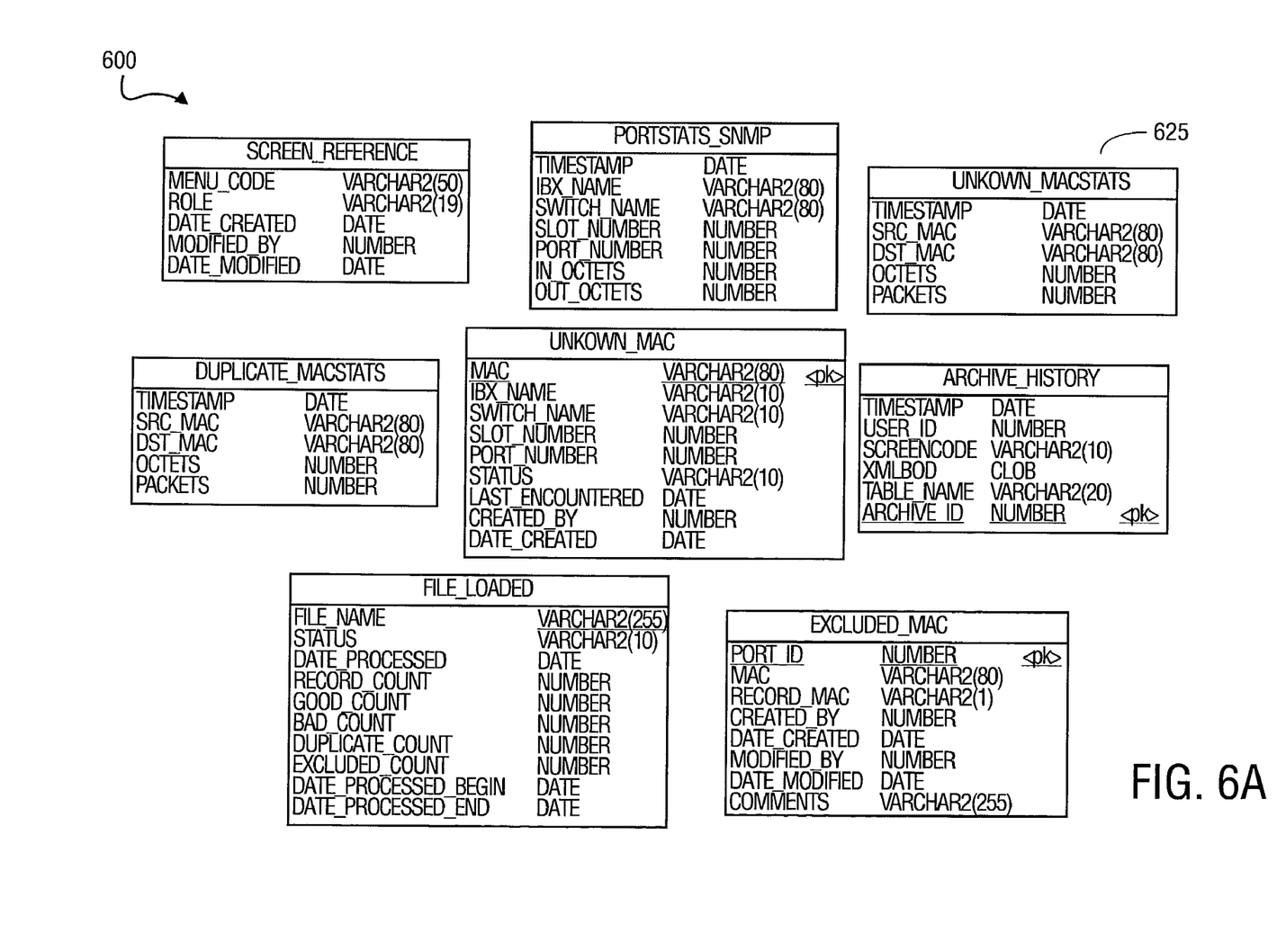
FIG. 6 illustrates a database Entity-Relationship diagram of the traffic account and route customization system according to one embodiment of the invention.
Figure 6B:
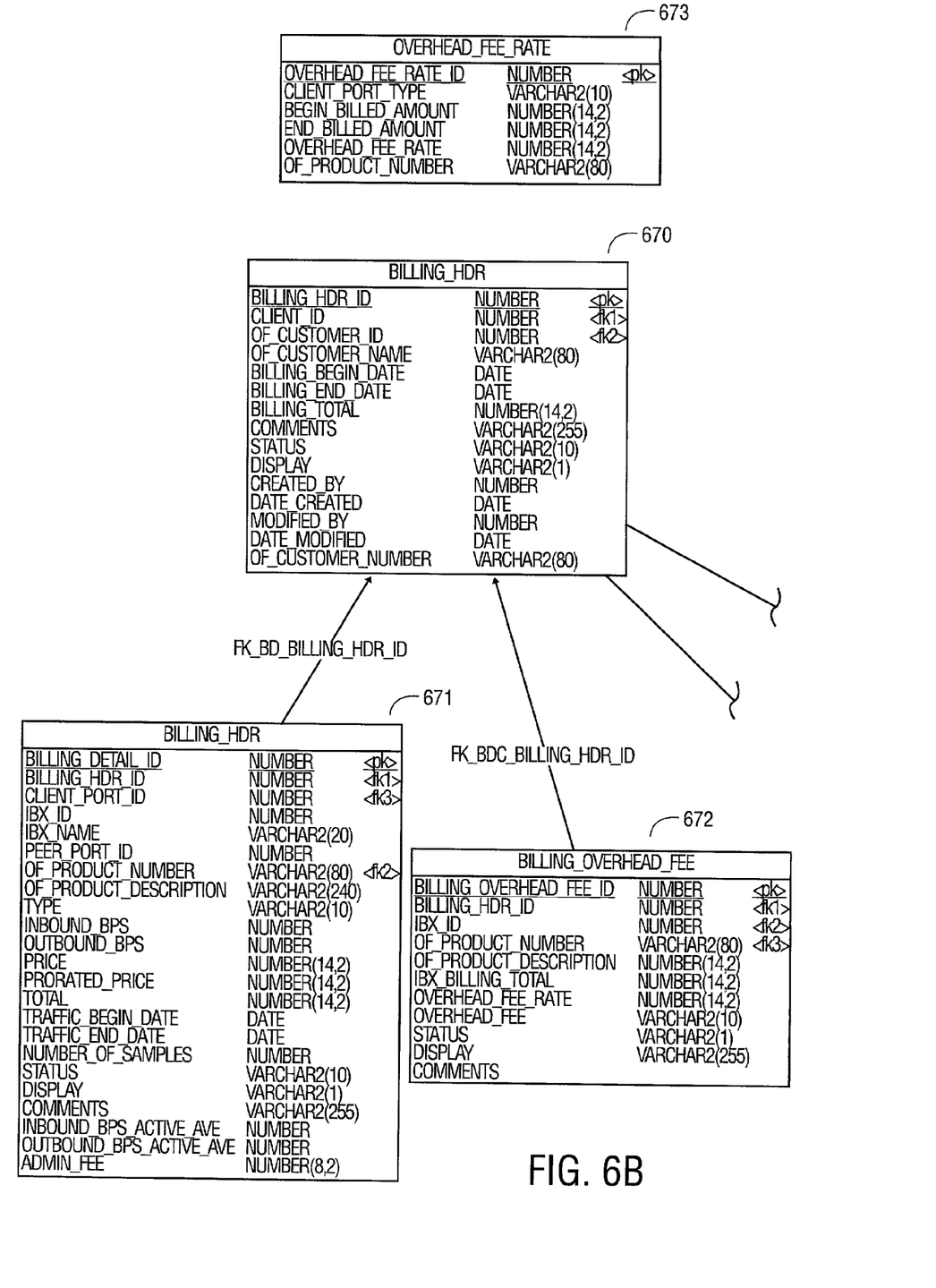
Figure 6C:
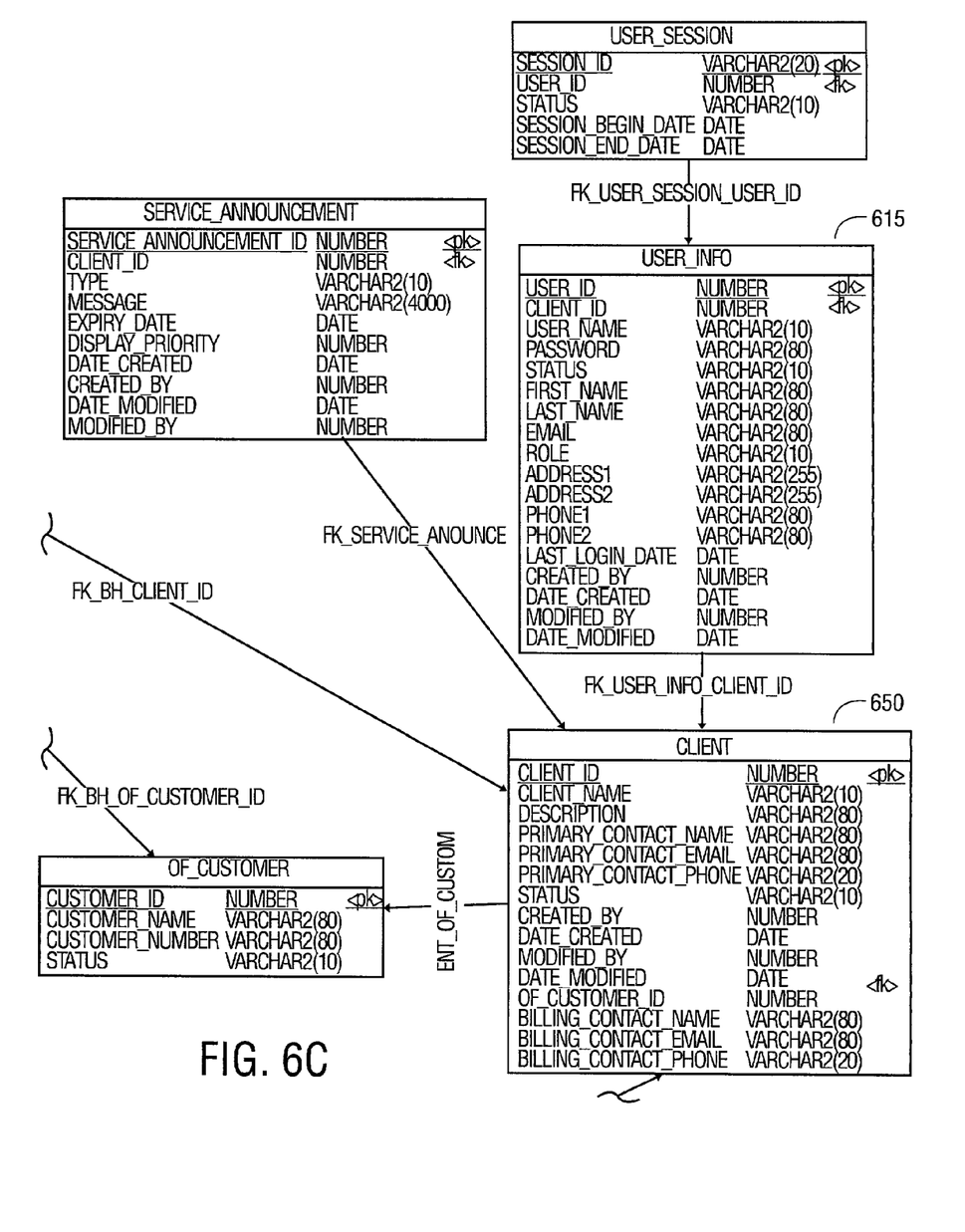
Figure 6D:
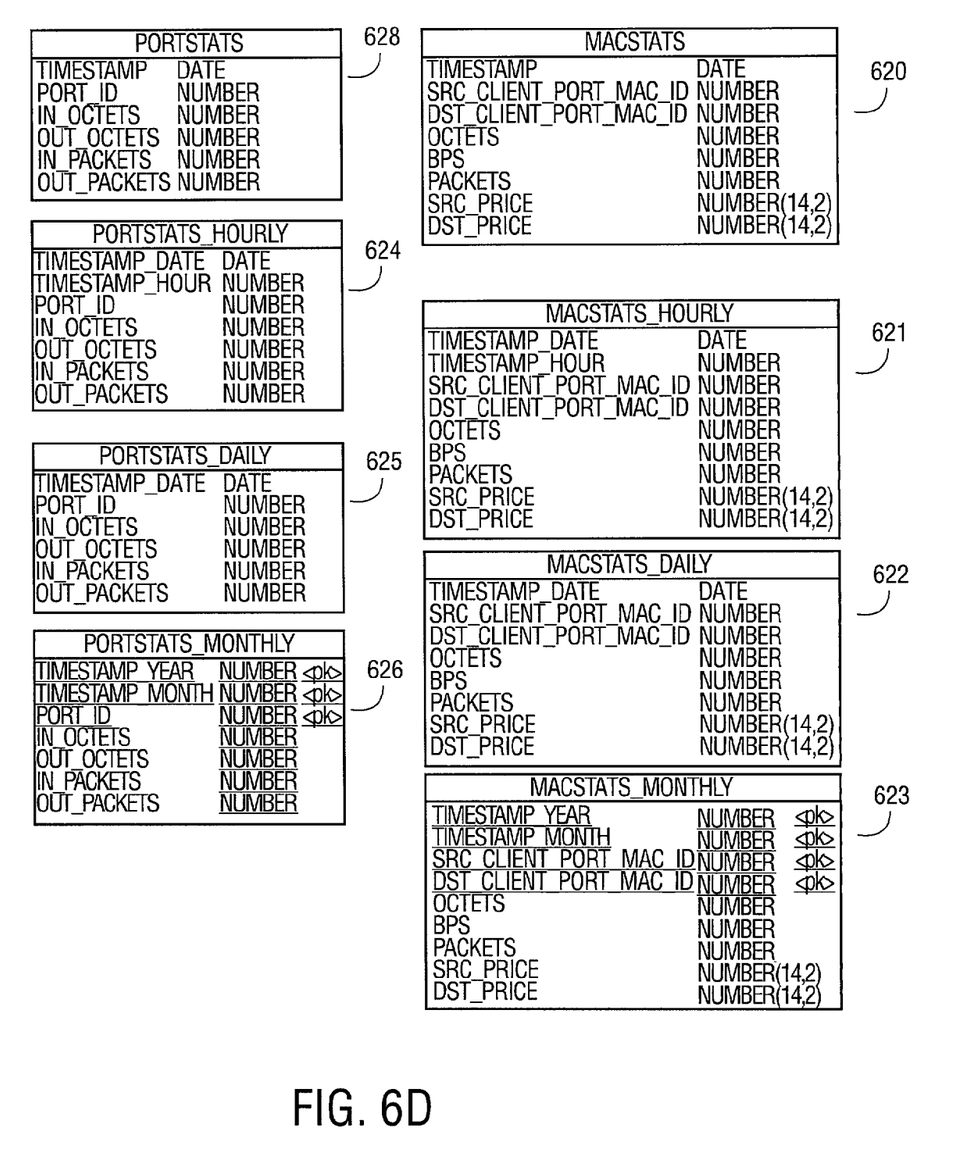
Figure 6F:
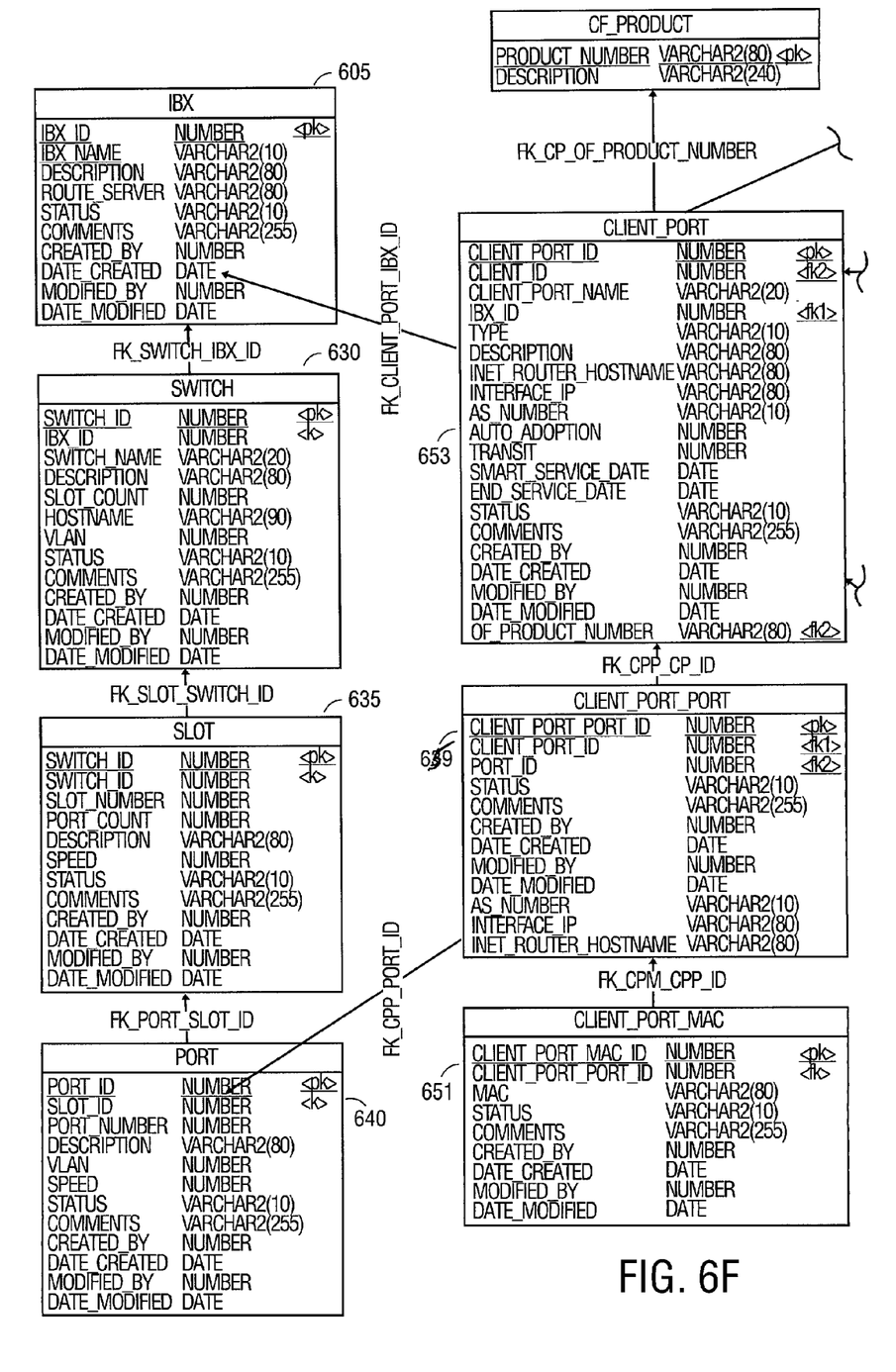
Figure 6G:
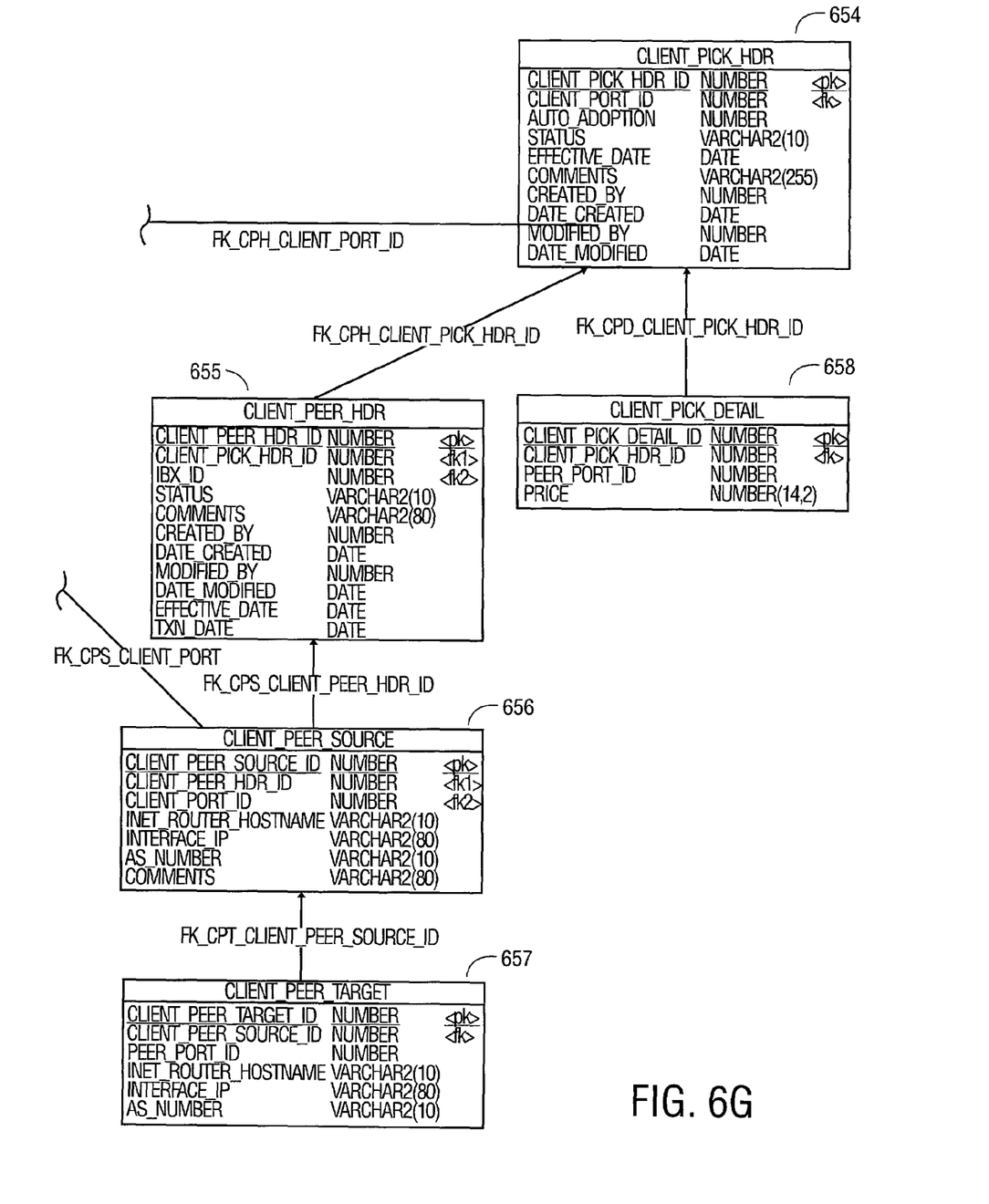

Furthermore, the traffic accounting component 340 provides aggregate billing information to each user 230 for the entire network usage of multiple network service providers 220. The traffic accounting component 340 uses a many-to-many network traffic usage tracking technique to provide aggregate billing of each user 230 in the network environment 200 with multiple network service providers 220, as will be described. FIG. 5 provides a process flow for accounting network traffic according to one embodiment. At block 510, the traffic accounting component 340 receives network traffic information 325 from a plurality of users 230 to be routed by the network service providers 220. Typically, the network traffic includes multiple data packets of each user 230 that includes a media access control (MAC) address. The transmission of network data packets with encapsulated MAC addresses is well known to those of ordinary skill in the art. A MAC address a hardware address unique to each network element connected to a network. Each data packet includes the MAC address of an originating and destination network element. The traffic accounting component 340 uses the MAC address of the network traffic to identify and account for the network traffic usage and billing units associated with each user 230.

Therefore, the database 370, at least stores a data record associating each MAC address of each network element on the network with a specific user 230. In one embodiment, the database 370 also stores additional network element data, such as data describing each switch, slot, and port on the network 200. In the ER diagram 600, a serial number is assigned to each switch, slot, and port component to guarantee uniqueness in a switch table 630, a slot table 635, and a port table 640 respectively. For example, in network 200, a switch belongs to an instance of the system 205 (identified in IBX table 605) and has a number of available slots. A blade belongs to a switch and has a number of ports. Each network element MAC address of each users 230 is associated with a user port and a user switch. This inter-relationship provides a consistent view of the user install-base and inventory control.

In one embodiment, a software module, such as the Foundry VM1 module from Foundry Networks, Inc., of San Jose, Calif., might forward Layer 2 traffic on a periodic basis to a InMon data collector software component (not shown) from InMon Corp., of San Francisco Calif., in a raw format (ex. 0006533AE300→000628DBCD41 8342 Octets 231 Frames). Here, the details extracted from the network traffic information may include) a source MAC address, a destination MAC address, a timestamp of each packet, octets and packets.

The traffic accounting component 340 checks the source and destination MAC address against the active MAC addresses stored in the database 370 (e.g., stored in a CLIENT_PORT_MAC table 651). If both MAC addresses are known, the traffic details are put into the MACSTATS table 620 (shown on ER diagram 600). If either the source or destination MAC addresses are not known in the database 370, all traffic information 325 associated with these MAC addresses are inserted into a MACSTAT_UNKNOWN table 625 for further analysis and a notification is sent to inform an administrator of system 205 of the unknown MAC address (this is needed to generate more accurate billing as will be described).

At block 520, the traffic accounting component 340 determines the aggregated network traffic usage of each user 230 based on the MAC address. Here, the traffic accounting component 340 may pull information from the MACSTATS table 620 (or hourly daily, or monthly statistics from the 621, 622, and 623 tables respectively) and the associated user information stored in the Client tables 650, 651, 652, 653, 654, 655, 656, 657, 658, 659, 660, and 661 to build an online traffic report on a periodic basis (e.g., hourly, daily, monthly basis). For example, the traffic accounting module may pull the aggregate network usage of a single user 230 by querying all the MAC addresses associated with the user for a time period based on the timestamp. The total network usage (e.g., total bytes, total time) may then be multiplied times the billing rate of each individual network service provider 220 to determine billing information, such as, the total billing cost, the billing cost per network service provider, etc., (block 530). This billing information may then be formatted into a billing statement 365 and forwarded to the user 230. The billing information may also be stored in the database 370 (for example, in a tables 671, 672, and 672) to be accessed.

In one embodiment, the MAC traffic accounting, as described, is compared with Port traffic accounting, to ensure the accuracy of the billing information. The Port traffic accounting via the SNMP protocol (e.g., measurement of ingress and egress traffic on a physical network port) is a well known technique to those of ordinary skill in the art, for measuring network traffic. The traffic accounting component 340 stores the port level traffic statistics in the PORTSTATS table 628 (or hourly, daily, or monthly statistics in tables 624, 625, and 626 respectively). In this alternative embodiment, the traffic accounting component 340 utilizes port traffic accounting to ensure billing accuracy only and not for billing. The comparison process extracts MAC traffic accounting data from the MACSTAT table 620 and aggregates to a physical network port level. These two sets of traffic statistics are compared on a periodic basis (e.g., daily). If the system 205 detects a discrepancy within an unacceptable level, a notification is sent to inform an administrator of system 205.

In one embodiment, the monthly calculation of bandwidth usage is based on a ninety-fifth ($95^{th}$) percentile algorithm. For example, the ingress and egress traffic samples may be captured and stored in the database 370 one a periodic basis (e.g., every five minutes). The $95^{th}$ percentile algorithm aligns the entire billing cycle samples (8,640=12 per hour*24 hours*30 days per month) from highest to lowest separately for ingress and egress. The highest five percent samples are discarded and the next highest of either ingress or egress is the billing usage.

It should be understood that the system 205 expects various network elements to be inserted or removed from the network 200, which may impact the accuracy of traffic accounting. For example, if a user's 230 router interface card becomes defective and replaced, the new interface card will contain a new unique MAC address. Here, the traffic accounting component 340 will periodically inventory every MAC address on the network by probing every active port. All active MAC addresses are stored in the Database 370 and an administrator of system 205 should be notified of the unknown MAC addresses. The unknown MAC addresses should be investigated and associated to an existing user 230, or the network element port delivering this unidentified network traffic should be made inactive. One way the administrator may reconcile the discrepancies is by evaluating the unknown MAC addresses with the known owners of specific switches, slots, and ports.

Figure 7:
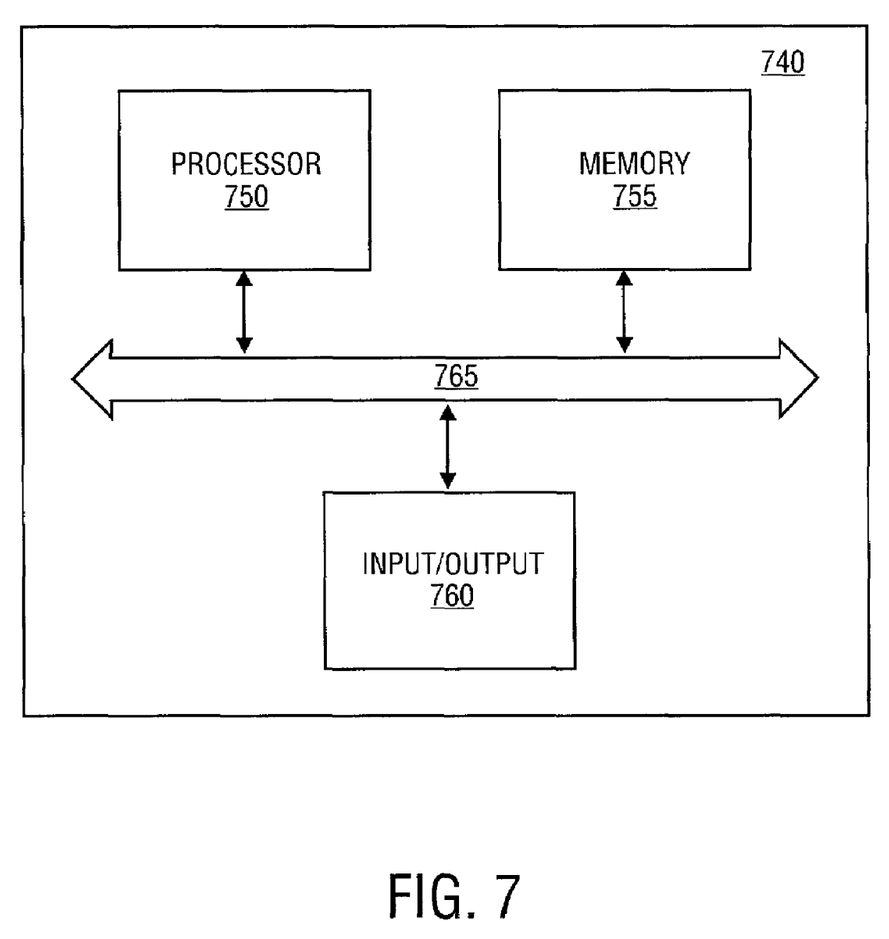
FIG. 7 illustrates a schematic diagram of a computer system suitable for use as the traffic account and route customization system according to one embodiment of the invention.

One embodiment of a computer system suitable for traffic accounting and route customization system is illustrated in FIG. 7. The computer system 740 includes a processor 750, memory 755 and input/output capability 760 coupled to a system bus 765. The memory 755 is configured to store instructions which, when executed by the processor 750, perform the methods described herein. Input/output 760 allows for the modification of the data stored in database 370. Input/output 760 also encompasses a receiver, a transmitter, and various types of machine-readable media, including any type of storage device that is accessible by the processor 750.

The description of FIG. 7 is intended to provide an overview of computer hardware and other operating components suitable for implementing the invention, but is not intended to limit the applicable environments. It will be appreciated that the computer system 740 is one example of many possible computer systems that have different architectures. A typical computer system will usually include at least a processor, memory, and a bus coupling the memory to the processor. One of ordinary skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

It will be appreciated that more or fewer processes may be incorporated into the method illustrated in FIGS. 4 and 5 without departing from the scope of an embodiment of the invention and that no particular order is implied by the arrangement of blocks shown and described herein. It further will be appreciated that the method described in conjunction with FIGS. 4 and 5 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components.

The method may be provided as a computer program product that may include a machine-accessible medium having stored thereon instructions that may be used to program a computer (or other electronic devices) to perform the method. Thus, a machine-accessible medium includes any mechanism that provides (i.e., stores and/or transmits) information in a form accessible by a machine (e.g., a network element). For the purposes of this specification, the terms "machine-accessible medium" shall be taken to include any medium that is capable of storing or encoding a sequence of instructions for execution by the machine and that cause the machine to perform any one of the methodologies of the present invention. The term "machine-accessible medium" shall accordingly be taken to include, but not be limited to, solid-state memories, as well as optical and magnetic disks. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

It should be understood that the components of the system 205 may be combined or separated into multiple components, or the components may also be executed in parallel with redundant servers, and therefore, the system 205 of FIG. 2 is to be regarded as illustrative rather than restrictive. In addition, the system 205 might also include a security component (not shown) from which the users 230 and the network service providers 220 must first communicate with in order to authorized the users permissions to submit a route customization change request or pricing information. Therefore, system 205 may collect user information for each user 230 and network service provider 220 to be stored in the user information table 615.

While the invention has been described in terms of several embodiments, those skilled in the art will recognize that the invention is not limited to the embodiments described. The method and apparatus of the invention can be practiced with modification and alteration within the scope of the appended claims. The description is thus to be regarded as illustrative instead of limiting on the invention.

What is claimed is:

1. A system for providing customized network routing comprising:
an accounting and routing coordinator configured to connect to network elements, including routers, from a plurality of Internet network service providers connected to a network, wherein the accounting and routing coordinator is configured to provide Internet transit network services to a plurality of users, where each user has one or more network elements that connect to network elements of the plurality of Internet network service providers (ISP) through the accounting and routing coordinator, and wherein the accounting and routing coordinator to further include a database and a route customization server, wherein the database to store a plurality of user criteria regarding Internet network service in change requests previously provided by each of the users and to store network service information from the plurality of Internet network service providers;

a traffic accounting server configured to provide billing information to the one of the plurality of users based on the network services to be provided by the selected Internet network service provider's routers, the billing information being based on one or more media access control (MAC) addresses being used by the one of the plurality of users, wherein the traffic accounting server to further determine an aggregate network usage of each user based on the MAC address and to calculate billing information for each user based on the aggregate network usage, and wherein the route customization server connected directly to the network elements of the plurality of users, is configured to route Internet packets using Border Gateway Protocol, and to automatically select the Internet network service providers to automatically re-route the network services to, including the Internet packets, from at least one of the plurality of users based on at least one of a change request being provided by one of the plurality of Internet network service providers and based on users' criteria provided by the plurality of change requests previously provided by the plurality of users stored in the database, wherein the accounting and routing coordinator is configured to establish a communication circuit route between each user and ISP that satisfies the users' criteria given in the change request.

2. The system of claim 1 further comprising:

a user interface, the one of the plurality of users to generate the change request with the user interface, the change request to include network service criteria describing the network services to be provided by the selected Internet network service provider's routers, wherein two or more ISPs are selected to be connected to a first user at the same time.

3. The system of claim 2 wherein the database further stores media access control addresses of each network element on the network with a specific user and stores media access control addresses of the network elements from the plurality of Internet network service providers for the route customization server to select the Internet network service providers to automatically re-route the network services to, including the Internet packets, from at least one of the plurality of users.

4. The system of claim 2 wherein the plurality of Internet network service providers' routers provide pricing information of the network services to the route customization server via the user interface, the route customization server to select the peering of the one of the plurality of users and the Internet network service providers based on the pricing information.

5. The system of claim 2, wherein the user interface further comprises an auto-adoption box for automatically re-routing to any network service provider meeting the user's criteria.

6. The system of claim 1 further comprising:

a route server to receive a policy rule from the route customization server, the policy rule to describe each one of the selected Internet network service providers are to provide network services to each one of the plurality of users.

7. The system of claim 1 wherein the one of the plurality of users connects with the route customization server directly to route network traffic of the one of the plurality of users to each selected Internet network service provider routers, and each of selected Internet network service provider routers connects directly with the route customization server to route network traffic of the one of the plurality of users to the one of the plurality of users.

8. The system of claim 1, wherein the network services includes routing network traffic for the one of the plurality of users, the billing information being based on the amount of network traffic each of the selected network service provider routers carries.

9. The system of claim 8, wherein the network traffic includes a plurality of data packets having a timestamp and at least one of the MAC addresses.

10. The system of claim 8, wherein the MAC addresses not associated with the plurality users is identified.

11. The system of claim 1, wherein the traffic accounting server having an input to receive network traffic information on a periodic basis and to calculating an aggregate network usage based on a ninety-fifth percentile algorithm.

12. The system of claim 1, wherein the traffic accounting server to provide the billing information to each user in an electronic billing statement.

13. A machine-accessible medium having instructions, which when executed by the machine, to cause a machine to perform a method for customizing a plurality of routes comprising:

receiving a plurality of electronic change requests from a plurality of users, the change requests having network service criteria including internet network service capability information;

storing the plurality of electronic change requests from a plurality of users; then storing media access control addresses of each network element on the network associated with a specific user as well as media access control addresses of one or more of the network elements from the plurality of Internet network service provider;

receiving an electronic change request from one of a plurality of Internet network service providers;

selecting one or more Internet network service providers from a plurality of Internet network service providers (ISP) to automatically re-route network traffic, including Internet packets, for at least one of the plurality of users, the selecting is based on the received network service criteria information;

automatically re-routing the network traffic of the plurality of users, which have user criteria matching the network service criteria associated with the change request of the one of the plurality of network service providers;

routing the Internet packets using Border Gateway Protocol;

establishing a communication circuit route between each user and ISP that satisfies the network service criteria given in the change request;

providing billing information to the plurality of users based on the network services to be provided by the selected Internet network service providers, wherein the billing information being based on one or more media access control (MAC) addresses being used by the network elements associated with that user; and determining an aggregate network usage of each user based on the MAC address and to calculate billing information for each user based on the aggregate network usage.

14. The machine-accessible medium of claim 13 further comprising:

receiving an electronic change request from the network service providers to change the pricing of the network services, wherein a first ISP and a second ISP are connected to a first user at the same time based on the network service criteria given in the change request.

15. The machine-accessible medium of claim 13 wherein the network service criteria information describes the network service providers to reject.

16. The machine-accessible medium of claim 13 wherein the routing is determined based on whether the selected one or more network service providers are available.

* * * * *